United States Patent [19]

Gordon

[11] Patent Number: 5,314,055
[45] Date of Patent: May 24, 1994

[54] PROGRAMMABLE RECONFIGURABLE PARTS FEEDER

[75] Inventor: Steven J. Gordon, Boston, Mass.

[73] Assignee: Intelligent Automation Systems, Inc., Cambridge, Mass.

[21] Appl. No.: 935,644

[22] Filed: Aug. 25, 1992

Related U.S. Application Data

[63] Continuation of Ser. No. 573,418, Aug. 25, 1990, abandoned.

[51] Int. Cl.$^5$ .............................................. B65G 43/08
[52] U.S. Cl. ..................................... 198/395; 198/396
[58] Field of Search .............. 198/395, 396, 366, 369; 221/158, 159, 163, 166, 167

[56] References Cited

U.S. PATENT DOCUMENTS

| | | | |
|---|---|---|---|
| 2,877,884 | 3/1959 | Esenwein | 198/395 X |
| 3,881,605 | 5/1975 | Grossman | 198/395 X |
| 4,333,558 | 6/1982 | Nonaka et al. | 198/395 X |
| 4,435,837 | 3/1984 | Abernathy | |
| 4,465,174 | 8/1984 | Uhl | 198/369 X |
| 4,509,081 | 4/1985 | Peyton et al. | |
| 4,608,646 | 8/1986 | Goodrich et al. | 198/395 X |
| 4,619,356 | 10/1986 | Dean et al. | 198/395 |
| 4,712,974 | 12/1987 | Kane | 414/757 |
| 4,750,035 | 6/1988 | Chang et al. | 358/106 |
| 4,776,466 | 10/1988 | Yoshida | |
| 4,819,784 | 4/1989 | Sticht | 198/395 |
| 4,858,156 | 8/1989 | Martin | 209/524 X |
| 4,909,376 | 3/1990 | Herndon et al. | 198/395 |
| 4,915,237 | 4/1990 | Chang et al. | 198/372 X |
| 4,934,537 | 6/1990 | De bourke | 198/367 X |

FOREIGN PATENT DOCUMENTS 0135495 3/1986 European Pat. Off.

OTHER PUBLICATIONS

Teoh, E. K. et al., "An Intelligent Robotic Vision System-Automatic Keyboard Assembly", 1987 IEEE Region 10 Conference, Aug. 1987, pp. 550-553.

Smals, A. T. J. M., "Economy Vision", Sensing in Robotic Control, 8279 Robotics, Jun. 1987, No. 2, Amsterdam, The Netherlands, pp. 175-180.

Miyakawa, A. et al., "A Flexible Assembly Station With Visual Sensors", IECON '84, International Conference on Industrial Electronics, pp. 1036-1040.

*Primary Examiner*—Cheryl L. Gastineau
*Attorney, Agent, or Firm*—Dike, Bronstein, Roberts & Cushman

[57] ABSTRACT

The invention comprises a flexible parts feeding system which can feed a large number of different types of parts to a manipulator. The system comprises a vibrating platform, a conveyor belt, a series of guides to assist in positioning and orienting parts, a vision based system for determining the orientation of a part in the staging area, and computer programming for instructing the manipulator to grasp the part if it is properly oriented in the staging area. The vibratory amplitude and speed, the speed of the conveyor belts, the positioning of the guides and the part signature of the vision system are all programmable responsive to the part which is to be fed.

5 Claims, 3 Drawing Sheets

PROGRAMMABLE RECONFIGURABLE PARTS FEEDER

This application is a continuation division of application Ser. No. 07/573,418, filed Aug. 25, 1990, now abandoned.

FIELD OF THE INVENTION

This invention relates to parts feeding systems for automated manufacturing. More particularly, the invention relates to a programmable reconfigurable parts feeder for feeding different types of parts from parts storage bins to part manipulators such as a robotic arm/hand.

BACKGROUND OF THE INVENTION

Automated flexible assembly systems (FAS) are capable of being programmed to assemble several different products on a single assembly line with minimal equipment changes. For manufacturers who produce several different products in volumes too small to justify the expense of having a separate assembly line for each product, FASs are more economical than traditional manual or dedicated automated production methods. FASs allow a manufacturer to produce several different products in limited volumes with essentially the same amount of equipment that would be necessary to produce a single product in high production volumes. Flexible assembly systems are also advantageous over dedicated automated systems because when a product is updated or redesigned, a FAS typically can be modified to produce the new, redesigned product with minimal or no equipment changes.

In accordance with the above described characteristics, FASs require parts feeding systems which can feed a variety of different parts on command in proper orientation, position and spacing to the part manipulator (such as a robotic arm or machine tool). The most common type of flexible parts feeder is the vibratory bowl feeder. A vibratory bowl feeder comprises a cylindrical container with a spiral track or groove extending from the floor of the container to the top rim. The entire assembly is motivated by a helical vibration which tends to convey the parts up the spiral track. Disposed along the path of the spiral track are one or more guides, for example, a height bar, which tend to orient the part in the desired orientation or, if the part cannot be properly oriented, will not let the part continue up the track. A part which cannot pass through the guide will eventually fall from the track back to the bottom of the cylindrical container and start its way back up the track again, possibly in an orientation which can pass through the guide or guides. Conventional bowl feeders must be custom tooled to a single part, or a small number of parts which are substantially identical in size and shape and are, therefore, inappropriate for FAS use.

Flexible parts feeding systems have been developed for FASs utilizing the bowl feeder type of system. Such systems are described, for instance, in Maul G. P., Goodrich, J. L., *A Methodology for Developing Programmable Parts Feeders*, IIE Trans., v. 15, no. 4, 1983, and Suzuki, T., Kohno, M., *The Flexible Parts Feeder Which Helps A Robot Assemble Automatically*, Assembly Automation, v.1, no. 2, 1981.

Other flexible parts feeding systems have been designed using conveyor belts or linear vibratory tracks rather than the spiral shaped tracks found in bowl feeders. Zenger, D., Dewhurst, P., *Automatic Handling Of Parts For Robot Assembly*, Annals of CIRP, v. 33, no. 1, 184 and Cowart N. A., et al., *Programmable Assembly Research, Technology Transfer To Industry-Phase II*, Westinghouse R & D Center, ISP 78-18773, Pittsburgh 1981, describe systems which use simple interchangeable mechanisms to customize a conveyor to reject parts not in a particular orientation. In these systems, an optical sensor is mounted at the end of a conveyor and checks the orientation of each part as it passes under the sensor by comparing its optical signature with a sample signature stored in memory. Some of these types of systems use linear vibration to urge the parts along the track in the desired direction.

U.S. Pat. No. 4,909,376, issued to Herndon et al., discloses an automated parts feeding mechanism which utilizes visual monitoring to determine the location and orientation of parts. In this device, a feed plate having multiple parts thereon is vibrated to urge the parts along its top surface and a counter rotating brush is positioned above the vibrating plate to help separate the parts. The parts are transported to a viewing section where a camera takes a video image of each part. The image is computer analyzed to determine the location and orientation of the part. If the part is appropriately positioned and oriented a manipulator is controlled to pick up the part whereupon the part can be assembled to the product or further worked on.

It is an object of the present invention to provide an improved parts feeding system for a flexible assembly system.

It is another object of the present invention to provide an automatically reconfigurable parts feeding system that can be adapted to feed parts of a wide variety of shapes and sizes.

It is another object of the present invention to provide an automatically reconfigurable parts feeding system that can be adapted to feed parts of a wide variety of shapes and sizes without the need for manual intervention or changing of parts of the feeding system.

It is a further object of the present invention to provide a parts feeding system which can rapidly change the parts being fed through the system.

It is yet another object of the present invention to provide a parts feeding system which utilizes vision based parts inspection to improve reliability.

It is yet another object of the present invention to provide a parts feeding system which requires a minimal amount of hardware.

It is yet another object of the present invention to provide a parts feeding system having vision based part orientation determination which simultaneously obtains two different views of the part.

It is one more object of the present invention to provide a vision based parts feeding system which can be programmed to measure a region of interest in one view based on information obtained from another view.

SUMMARY OF THE INVENTION

The present invention comprises an on-line reconfigurable parts feeder which supplies parts to an assembly manipulator as required during an assembly sequence. The feeder can be rapidly purged of parts of one type and reprogrammed to feed parts of a different type to the manipulator.

The feeder system comprises a plurality of parts bins, each bin holding a different part type. The bins are mounted on a track or the like such that each bin can be moved into a position above a part feeding platform and dump the parts contained therein onto the platform. The platform is vibrated linearly to spread the parts out. At one edge, the tray abuts a rapidly moving, translucent conveyor belt. The platform is surrounded by a discontinuous wall with an opening where the platform is adjacent the conveyor belt. The conveyor belt picks up the parts as they migrate towards it and transports them to a staging area. Programmably adjustable guides are disposed along the path of the conveyor to separate and orient the parts and reject those parts which cannot be properly oriented. A programmably adjustable height bar may separate overlapping parts on the conveyor belt while a programmably adjustable wedge-shaped side guide places the parts in single file and may also assist in urging the part to a desired orientation. The parts that cannot pass through the guides, because of improper orientation which the guides cannot correct, fall off the conveyor onto an adjacent return conveyor which transports the parts back to the selected parts bin.

A staging area at the end of the conveyor belt comprises a camera to view each part and a back light underneath the translucent conveyor belt. A mirror is positioned relative to the camera and the conveyor belt, preferably at a 45° angle to each, such that the image received by the camera partially comprises a direct view of the part and a view through the mirror. Accordingly, the camera can receive two different views of the part within a single image. As each part enters the staging area, the conveyor is automatically stopped, and a processor analyzes the scene to determine if the part is in an orientation which will allow the manipulator to pick it up. If so, the part is picked up by the manipulator and the conveyor is started again. If, however, the part was in a proper orientation which the manipulator could not be programmed to pick up, the conveyor belt is restarted without the manipulator attempting to pick up the part. The part then drops off the end onto the return conveyor belt which returns it to the selected parts bin.

DETAILED DESCRIPTION OF A PREFERRED EMBODIMENT

Figure 1:
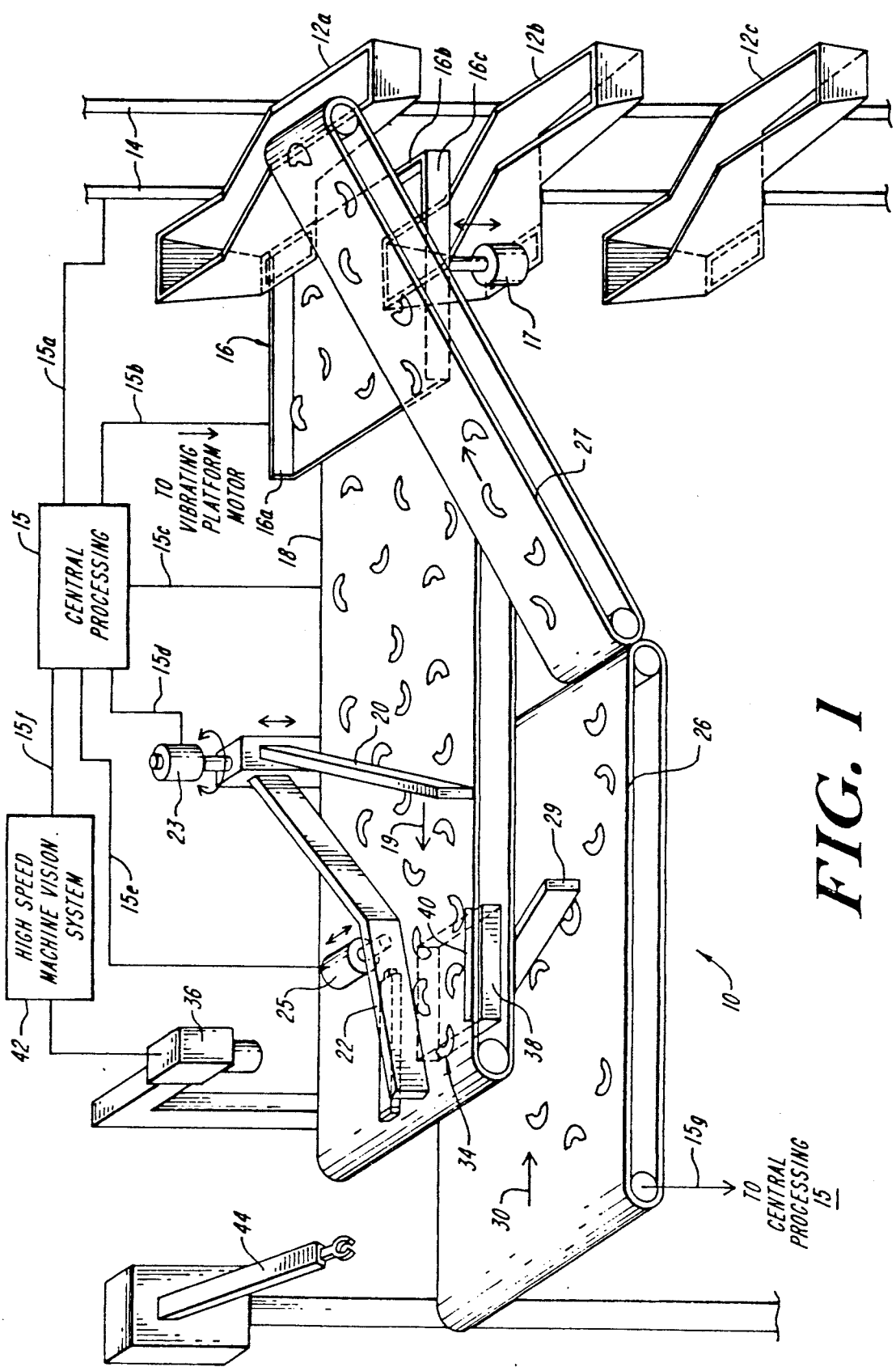
FIG. 1 is perspective view of the flexible feeder system of the present invention.

FIG. 1 shows a perspective view of the parts feeding apparatus 10 of the present invention. Parts bins are shown at 12a, 12b and 12c. Each bin is loaded with a plurality of parts of a single type. Typically, all of the parts in a single bin will be identical. However, parts may be slightly different depending on the application. The parts bins are movable along tracks 14. Many other systems for movable parts bins are known and can be used, such as bins mounted on a circular track, or lazy susan type tray arrangements. Movement of the parts bins is controlled by central processing unit 15 via line 15a such that the bin containing the parts needed for the desired assembly can be indexed to discharge position for dropping the parts into the next stage of the parts feeding system. In FIG. 1, for instance, bin 12a is shown in the discharge position for dropping parts into the next stage of the system.

When the appropriate bin, such as bin 12a, is moved into the discharge position, several (not necessarily all) parts in the bins are dumped onto a vibrating platform 16. The platform 16 is vibrated by motor 17. The purpose of the vibration is to spread the parts out and not to move them in a particular direction along the platform. Accordingly, the vibration is preferably linear and in the up-down direction and is of an amplitude greater than the amplitudes typically used to convey parts in a particular direction in parts feeding systems. The amplitude and speed of the vibration are variable and are set by a central processing unit 15 which is coupled to the motor 17 via line 15b in accordance with the part that is being processed. In general, the larger (or heavier) the part, the greater the desired amplitude and speed of the vibration.

As the platform 16 is vibrated, the parts will spread out and move about randomly on the platform. The platform is surrounded by walls 16a, 16b, 16c on three sides. The fourth side is open to adjacent conveyor belt 18. The platform 16 may be slightly tilted towards the conveyor belt to provide a general migration of parts in that direction. Air streams might also be employed for the same purpose. Some of the parts will initially move toward conveyor belt 18 and will be picked up by the belt which will be moving in the direction of arrow 19. The speed of the conveyor belt 18 is also automatically adjustable under processor control via line 15c. In the preferred embodiment, for each different part, the speed of belt 18 is set relative to the vibration of the vibrating platform 16 such that when a part is picked up by the conveyor belt 18, it will be moved at a substantially higher speed than it was while the part was on the vibrating platform 16. This will generally cause the parts to be more spread out on the conveyor belt. Since the vibration of the platform causes the parts to move about randomly, most, if not all, parts will eventually migrate towards and be picked up by the conveyor belt 18. The surface of the conveyor belt 18 should be of fairly high friction so that it can "grab" the parts.

Conveyor belt 18 passes through an "obstacle course" comprising one or more automatically adjustable guides which are positioned to help separate the parts and position them in a proper orientation for being operated on by a manipulator, such as a robotic arm/hand. FIG. 1 shows an adjustable height bar 20 and an adjustable side guide 22. Servo motor 23 is controlled by processor 15 via line 15d to raise and lower height bar 20. Servo motor 25 is controlled to move side guide 22 by processor 15 via line 15e. However, depending on the type of part being processed, additional and/or different types of guides may be employed. The height bar 20 is set to a height relative to the part being processed to help separate overlying parts.

Figure 2:
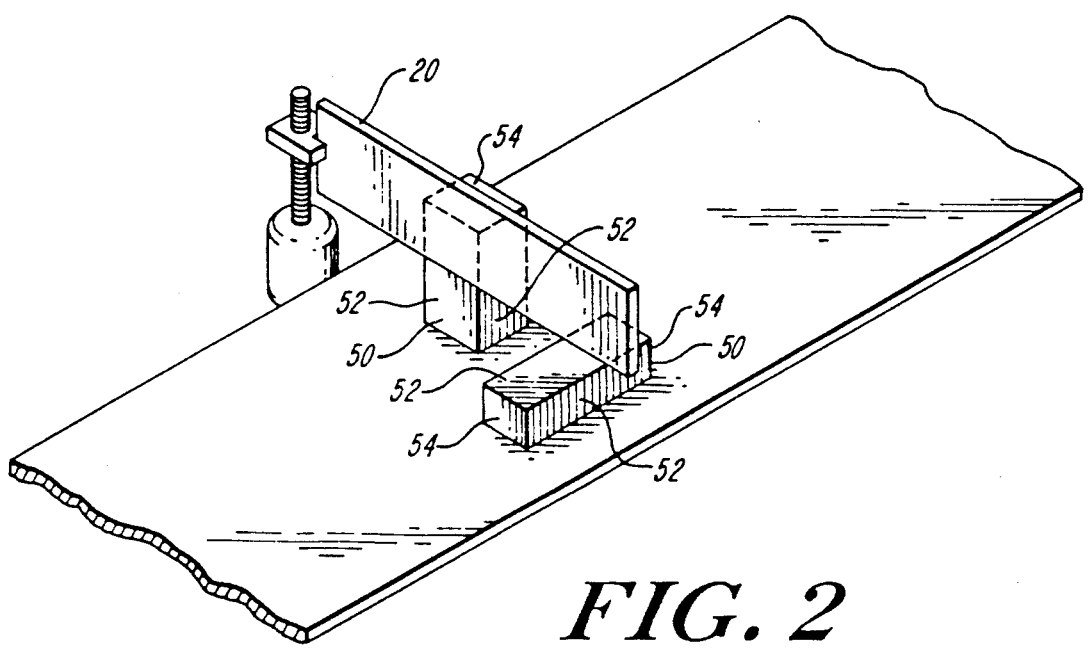
FIG. 2 illustrates the operation of the height bar of the present invention.

The height bar 20 may also serve to help properly orient the parts. In most instances, a part has a specific, limited number of orientations in which it can rest. For instance, the block-shaped part 50 shown in FIG. 2 can come to rest on the conveyor belt on one of its six sides. Of course, the block may be in any random lateral orientation on its side. However, subsequent side guides can force the part into the proper lateral orientation. If the block-shaped part is not symmetrical on all sides (i.e., it is not a cube), and it is desired to have the block oriented such that it is resting on one of its long sides 52, the height bar 20 may be adjusted to a height which will allow only parts lying on their long sides 52 to pass through. Blocks resting on a conveyor belt on their short sides 54 such that they are taller than blocks resting on their long sides will either be knocked down by the height bar 20 so that they can pass underneath it or will be knocked from the conveyor belt onto a return conveyor belt such as conveyor belt 26. Belt 26 moves in the direction of the arrow 30 and returns rejected parts back to parts bin 12a where they will be dumped back onto the vibrating platform and reprocessed through the system. The return conveyor belt 26 is preferably positioned adjacent to each guide along the path of the conveyor belt 18 such that those parts which can not pass through the guides fall off conveyor belt 18 onto return conveyor belt 26. As will become clear, the present invention, like all parts feeding systems which employ guides for orienting the parts, is best suited to feeding parts that can come to rest in a relatively few number of natural states. Many parts can be consistently oriented in the proper position for grasping by the manipulator by a series of properly set guides. However, many other parts, even after passing through an "obstacle course" of guides, may be in one of several positions some of which may allow the part to be grasped by the manipulator and some which may not. Accordingly, the fewer number of natural states in which the part can come to rest, the fewer the number of guides typically necessary to orient it and also the greater the probability that when a part reaches the staging area, it will be in an orientation in which the manipulator can grasp it. Most manipulators are capable of some reorientation of the part. Accordingly, parts in the staging area typically need not be in an exact orientation but only in an orientation which will allow the manipulator to grasp it and reorient it as needed.

FIG. 1 illustrates a side guide 22 for orienting parts. Side guide 22 also is automatically adjustable to a position which is determined as a function of the part being processed (i.e., the bin in the discharge position). Different types of side guides are well known in the prior art and will not be described in detail herein. The side guides assist in properly orienting the parts in preparation for grasping by a manipulator and also in directing the parts to the staging area 34. In the FIG. 1 embodiment, the next stage is the staging area 34, however, additional guides may be disposed in the path of conveyor belt before the staging area 34 to further separate and properly orient the parts.

The staging area comprises a video camera 36 which may be disposed above and looking down on the conveyor belt. In the preferred embodiment, the conveyor belt is translucent and light diffusive and a light source 38 is positioned beneath the belt to back light parts relative to the camera as they enter the staging area. The staging area also comprises a mirror 40 disposed adjacent the conveyor belt and at a 45° angle thereto. The camera 36 is positioned relative to the staging area and the mirror 40 such that the image obtained by the camera partially comprises a side view of the part through the mirror and partially comprises an overhead view. In this manner, information can be obtained on two different views of the part simultaneously using only a single camera.

As parts enter the staging area 34 and come into the view of the video camera 36, the belt 18 is automatically stopped. Various means may be used for determining when a part enters the staging area. The preferred method is to utilize a light sensor across the leading edge of the staging area 34. Belt 18 is programmed to stop responsive to the light beam of the light sensor being broken and then re-established. Alternately, the belts may be programmed to be stopped responsive to the image received by the camera containing a specified amount of dark content which would indicate that a part had entered the staging area and blocked light from light source 38 from reaching the camera.

Instead of utilizing the mirror, a second camera may be positioned to obtain a side view or any other view of the part in the staging area, however, this would add expense. Whether a second camera or a mirror is used, in the preferred embodiment, the side view is also back lit by a second light source positioned behind a light diffusing surface. Alternately, the side view may be back lit by use of a second mirror positioned to reflect the light from the first light source 38.

When the belt is stopped, the processing unit 15 instructs the vision system 42 and camera 36, via line 15f, to obtain an image of the staging area. The image from the camera or cameras is forwarded to high-speed vision processing unit 42 which processes the image information from the camera 36 by use of the blob analysis algorithms as described, for instance, in Nitzan, D. et al., *Machine Intelligence Research Applied To Industrial Automation*, Technical Report No. 12, project 2996 SRI Int., Menlo Park, Calif., 1983. The processing by blob analysis preferably is performed by hardware in order to minimize the time required. Vision Systems Inc. offers a processing board, the APA-512 board, which can perform a blob analysis on a part in approximately 1/30th of a second. Features such as area, center of area, number of holes, and principal axes of inertia are used in the algorithms to assure that the part is separated from other parts and to measure the parts orientation. This information is compared to signature information for the part being processed which is stored in memory to determine if the part is recognized. If the information obtained from the video image does not match to a sufficient extent the signature information, the part will be rejected. In the preferred embodiment illustrated in FIG. 1, the top view and side view are obtained simultaneously in a single image of the camera. This information can be processed in several ways. For instance, the top and side views can be processed as a single image and compared with signature information of what the part should look like when an image is obtained of it comprising both a top view and a side view. Alternately, the top view of the image may be processed first and then, based on the position and orientation of the part as determined from the top, a small region of the side view may be selected and analyzed to obtain whatever additional information may be desirable.

If the information obtained indicates that the part is in proper orientation for grasping by the manipulator 44, the manipulator 44 is provided with the position information necessary for grasping the part. After the manipulator 44 grasps the part, the conveyor belt 18 is restarted. If the information indicates that the part is in an orientation which the manipulator cannot adapt to, conveyor belt 18 is started again and the part drops off the end of the conveyor 18 onto return conveyor belt 26 and is returned to the parts bin 12a. The return conveyor system is shown in FIG. 1 as a single run comprising return conveyor belts 26 and 27 and side guide 29. However, conveyor, however any other type of system may be used, such as a slide with a movable basket at the end which is periodically moved to a position over the parts bin which is in the discharge position and drops parts back into the parts bin.

When it is necessary to change the parts bin, the bin is automatically closed such that any parts that continue to be returned to the parts bin remain in the parts bin and are not dropped back onto vibrating platform 16. The feeder 10 can be purged of parts in one cycle period of the system (i.e., the time it takes a part to move from the platform 16 to the staging area). The purging time can be reduced even further by use of airjets to blow parts off of the platform 16 and forward conveyor 18 and onto the return conveyor during purging. Also, the forward and return belt speeds may be increased during purging under instruction of processor 15 through lines 15c and 15g. Once the entire system 10 is purged of parts, the bins 12 can be moved and the process started all over again with a different bin.

Figure 3:
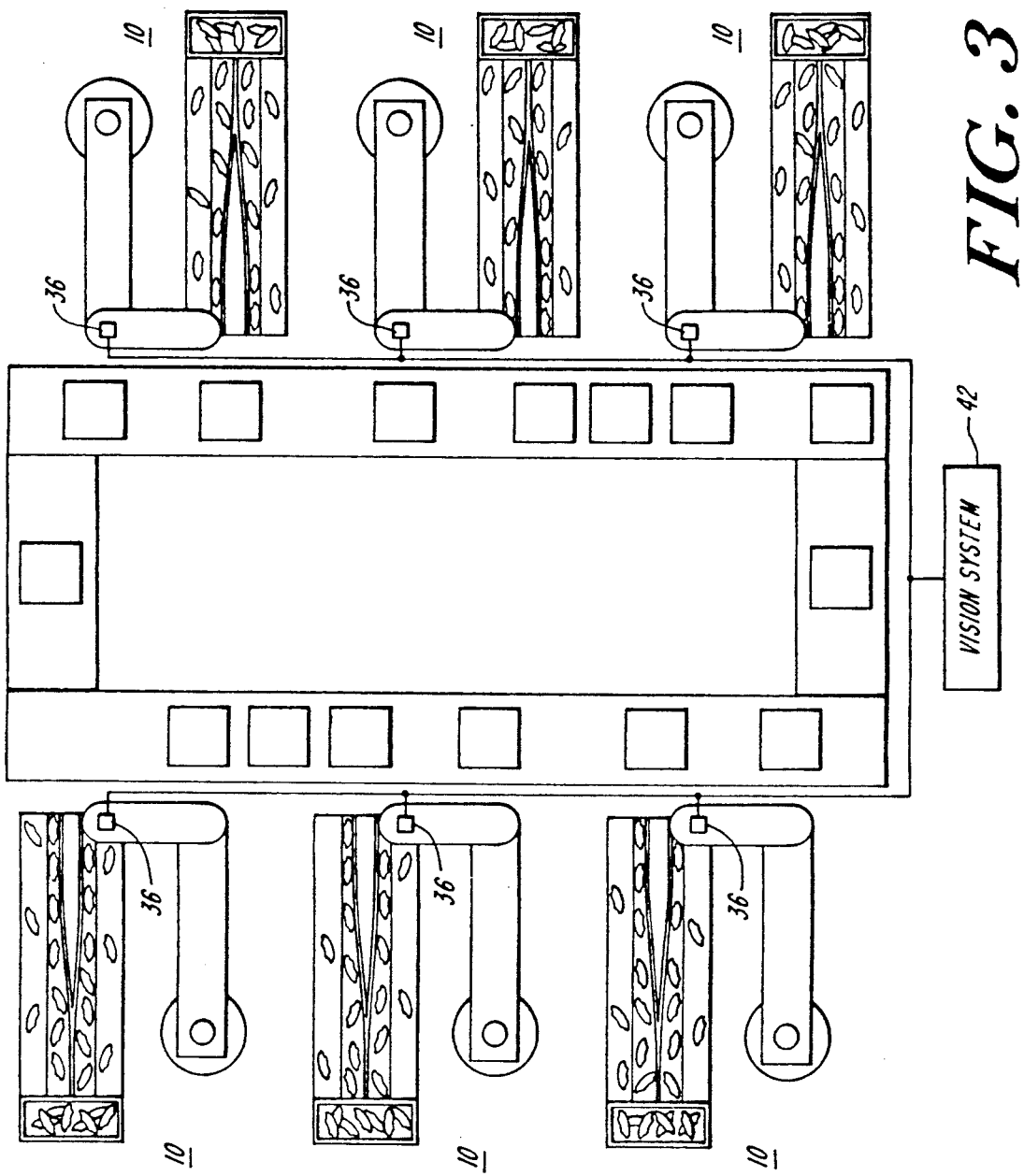
FIG. 3 shows an embodiment of the invention is which a single high speed machine vision system is shared between a multiplicity of reconfigurable parts feeders.

The robotic assembly cycle time of the manipulator may typically vary from one to four seconds. As stated above, the high speed vision system can obtain the image and process the information in approximately 1/30th of a second. Accordingly, the processing hardware, e.g., the APA-512 board, can be time shared between multiple cameras of multiple feeder assemblies 10 as shown in FIG. 3. For instance, if the robot assembly cycle period is 2 seconds and the vision system can obtain and process the image in 1/30th of a second, up to 60 separate cameras can time share a single APA-512 vision system board.

The feeder system 10 of the present invention is controlled by a central processing unit 15. The central processing unit 46 is programmed to control the indexing of the parts bins into and out of the discharge position, the adjusting of the guides (including the height bar), the speed of the conveyor belts, the speed and amplitude of vibration of the platform, the starting and stopping of the conveyor belt, the starting and stopping of the vision system, the time sharing of the vision system if necessary, the selection of the signature information for the vision system and possibly loading the signature information into the memory of the vision system processing unit. The programming necessary to control all of the above mentioned apparatus as described herein would be obvious to a person with skill in the art of programming machine assembly lines.

Having thus described a few particular embodiments of the invention, various alterations, modifications and improvements will readily occur to those skilled in the art. For instance, it should be understood that the manipulator need not be an assembly robot, but may be a machine tool, parts sorter, or the like. In the case of a parts sorter, each parts bin might contain a variety of different parts types rather than a single part type and the vision system would be programmed to recognize a part and instruct the manipulator where to transport it. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A vision-based parts feeding apparatus for feeding parts to a manipulator, said apparatus comprising:
    means for delivering a plurality of parts of a first part type to a vibratory platform,
    said vibratory platform constructed and arranged to randomly disperse said parts by means of vibration,
    conveyor means adjacent said platform for transporting said parts along a path towards a staging area as said parts are dispersed from said platform, said transporting occurring at a substantially higher speed than said dispersing on said vibratory platform,
    guide means disposed along said path of said conveyor means for assisting in separating said parts and orienting said parts, including parts carried on said conveyor means in a single layer, into an orientation suitable for grasping by said manipulator,
    said staging area positioned subsequent to said guide means and comprising means for obtaining image information about a part in the staging area, said part being separated by the feeding apparatus from other parts being fed,
    processing means coupled to said image obtaining means for processing said image information to determine the orientation or identification of said part, and
    means for acting on said part responsive to the information obtained concerning the orientation or identification of said part.

2. A vision-based parts feeding system as set forth in claim 1 wherein said means for acting comprises
    means for instructing said manipulator to grasp said part if said part is in an orientation suitable for grasping by said manipulator, and
    means for returning said part to said means for delivering if said part is not in an orientation suitable for grasping by said manipulator.

3. A vision-based parts feeding apparatus as set forth in claim 1 wherein said image obtaining means comprises means for simultaneously obtaining a plurality of views of said part.

4. A vision-based parts feeding apparatus as set forth in claim 3 wherein said staging area further comprises a mirror disposed relative to said image obtaining means and said conveyor belt such that said image obtaining means simultaneously receives a first view of said part in a first portion of said image and a second view of said part through said mirror in a second portion of said image.

5. A vision-based parts feeding apparatus as set forth in claim 4 wherein said conveying means comprises a translucent conveyor belt and said apparatus further comprises light source means disposed under said conveyor belt in said staging area so as to back light said parts in said staging area relative to said image obtaining means.

* * * * *